United States Patent [19]

Law et al.

[11] Patent Number: 5,448,440
[45] Date of Patent: Sep. 5, 1995

[54] DATA STORAGE DEVICE WITH ROLLER LUBRICANT THAT PROVIDES EXCELLENT DRAG FORCE CHARACTERISTICS

[75] Inventors: Kam W. Law; Miguel A. Guerra, both of Woodbury; Mary R. Hable, Stillwater, all of Minn.

[73] Assignee: Minnesota Mining and Manufacturing Company, St. Paul, Minn.

[21] Appl. No.: 260,522

[22] Filed: Jun. 16, 1994

[51] Int. Cl.[6] ............................................. G11B 23/02
[52] U.S. Cl. .................................................... 360/132
[58] Field of Search ....................................... 360/132

[56] References Cited

U.S. PATENT DOCUMENTS 3,787,351  1/1974  Olson .
3,848,265  11/1974  Biery ................................. 360/60
4,406,801  9/1983  Onopchenko et al. .
4,795,764  1/1989  Alm et al. .

Primary Examiner—A. J. Heinz
Attorney, Agent, or Firm—Gary L. Griswold; Walter N. Kirn; David B. Kagan

[57] ABSTRACT

A data storage device, of the type having a roller mounted on a shaft, wherein the roller has a central bore adapted to receive the shaft, and wherein a lubricant is provided between the shaft and the roller, the lubricant comprising a lubricant carrier, a plurality of fluorinated resin particles dispersed in the lubricant carrier, and a dispersing agent which is a copolymer of monomers, the monomers comprising a nonfluorinated monomer and a fluorinated monomer, such that the copolymerized dispersing agent comprises a plurality of nonfluorinated segments and a plurality of fluorinated segments.

36 Claims, 1 Drawing Sheet

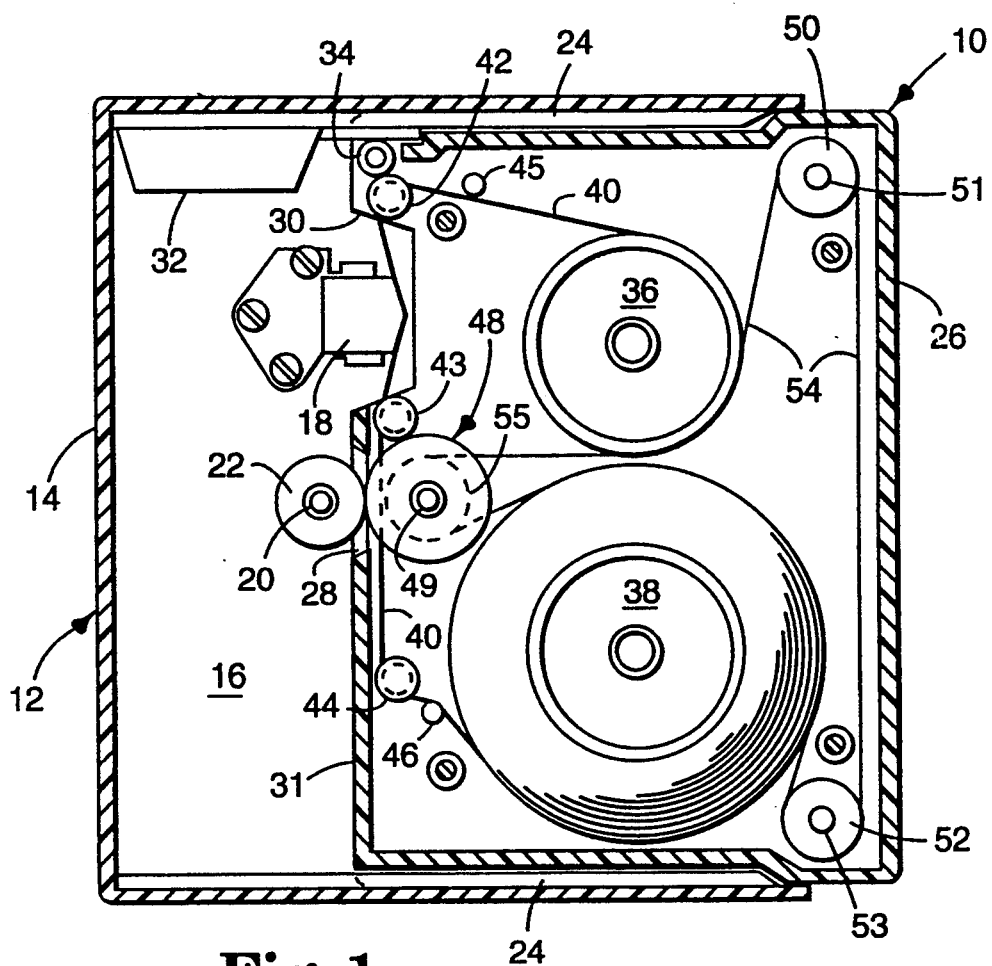
Fig. 1
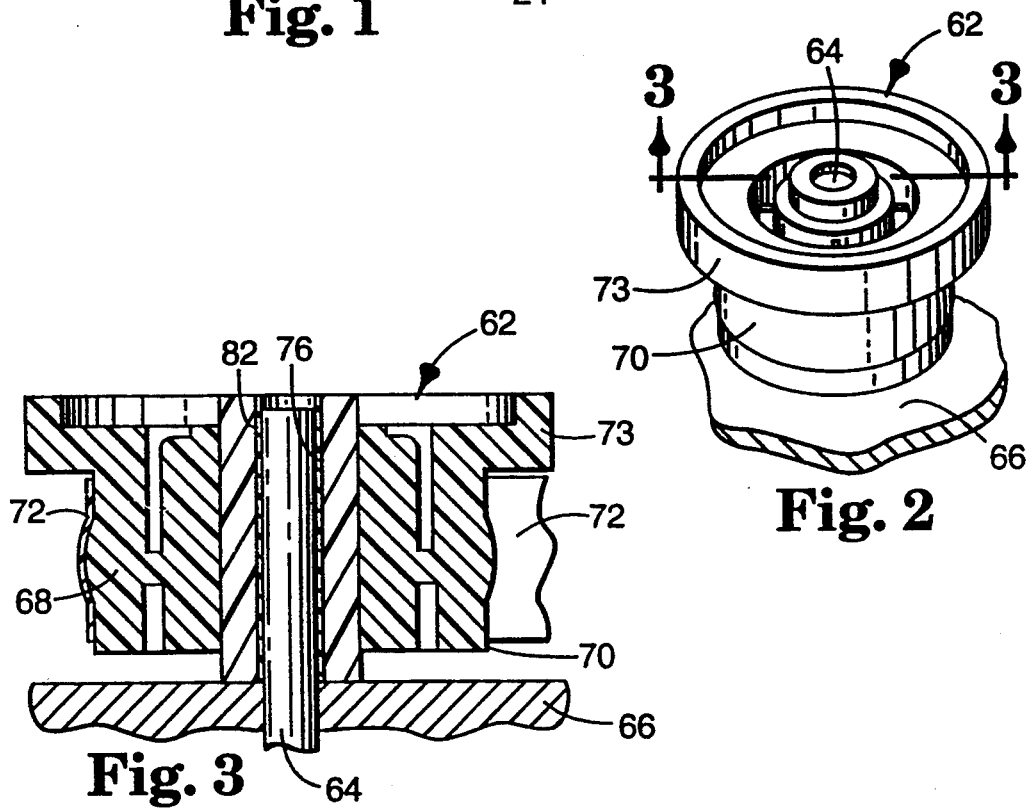
Fig. 2
Fig. 3

DATA STORAGE DEVICE WITH ROLLER LUBRICANT THAT PROVIDES EXCELLENT DRAG FORCE CHARACTERISTICS

FIELD OF THE INVENTION

This invention is in the field of belt-driven magnetic recording tape cartridges such as are described in U.S. Pat. No. 3,692,255 (Von Behren). More specifically, this invention relates to an improved drive roller lubricant for such belt-driven magnetic recording tape cartridges.

BACKGROUND OF THE INVENTION

The belt-driven tape cartridges of the Von Behren patent, U.S. Pat. No. 3,692,255, incorporated herein by reference, are commonly referred to as "data cartridges." A data cartridge typically includes a housing defining a thin, generally rectangular enclosure. The housing contains a length of magnetic recording tape which is wound upon a pair of tape reels. The magnetic recording tape is driven by an elastomeric drive belt which, in turn, is driven by a single, reversible drive motor. The drive belt provides rapid acceleration and deceleration of the recording tape in either direction. The drive belt is stretched along a drive belt path generally defined by a drive roller, a pair of corner rollers, and part of the tape pack wound on each reel.

Data cartridges must meet minimum tape tension specifications while simultaneously operating within maximum allowable drive force specifications. The tape tension must not fall below a certain level as the tape passes from spool to spool or else contact between a read/write head and the tape will be insufficient to allow successful data transfer. Conversely, the force required to rotate the cartridge drive roller cannot exceed the power rating of the motor in the associated drive. As both tape tension and drive force are dependent on friction within the cartridge, all friction sources must be controlled.

For example, a drive roller rotatably mounted on a drive roller shaft is one source of friction that must be controlled in a data cartridge. The friction between a drive roller and its shaft is referred to herein as the "drive roller drag force" or "drag force." To achieve the desired tape tension characteristics, it is desirable for the drive roller drag force to be as low as possible and as stable as possible over the life of the data cartridge. According to one approach, the desired low levels of drag force have been sought by applying a lubricant between a drive roller and its shaft. One kind of lubricant that has been used includes solid fluorinated resin, e.g., polytetrafluoroethylene (PTFE), particles dispersed in a nonfluorinated, e.g., hydrocarbon-based, grease.

SUMMARY OF THE INVENTION

We have now discovered that drag force characteristics of belt-driven magnetic recording tape cartridges can be improved by a lubricant containing fluorinated resin particles dispersed in a lubricant carrier, wherein the lubricant also contains a special additive to improve the compatibility and dispersibility of the particles with the lubricant carrier. The lubricant can be used between a drive roller and its shaft in a data cartridge to provide extremely low, very stable, drive roller drag force.

The advantages of the present invention are achieved by a data storage device of the type having a roller mounted on a shaft, wherein a lubricant is provided between the shaft and the roller, said lubricant comprising:
  a) a lubricant carrier,
  b) a plurality of fluorinated resin particles dispersed in said lubricant carrier,
  c) a dispersing agent in an amount effective to aid in dispersing said particles in said lubricant carrier, wherein the dispersing agent is a copolymer of monomers, said monomers comprising a nonfluorinated monomer and a fluorinated monomer, such that the copolymerized dispersing agent comprises a plurality of nonfluorinated segments and a plurality of fluorinated segments.

For the purposes of this invention, a lubricant carrier is defined as a material which provides a medium in which to disperse a plurality of fluorinated resin particles in order to form a useful lubricant.

BRIEF DESCRIPTION OF THE DRAWINGS

FIG. 1 is a broken-away top view of a tape cartridge inserted in a data cartridge drive.

FIG. 2 is a perspective view of a portion of the inside of a data cartridge showing a drive roller mounted on a drive roller shaft.

FIG. 3 is a cross-sectional view of the drive roller of FIG. 2 taken along line 3—3.

DESCRIPTION OF THE PREFERRED EMBODIMENTS

Referring now to FIG. 1, there is shown one example of a belt-driven data cartridge 10 according to the present invention. The cartridge 10 is shown engaged with a magnetic recording apparatus 12. As used herein, "magnetic recording apparatus" means an apparatus for recording or reproducing information that is stored on magnetic or optical recording tape. The magnetic recording apparatus 12 comprises a support frame 14 including a horizontal cartridge support deck 16 supporting a magnetic transducer head 18. The support deck 16 also supports, in a depending manner, a reversible drive motor (not shown), the shaft 20 of which extends through the support deck 16. A drive puck 22 is mounted on the shaft 20 above the support deck 16. Elongate guides 24 define the position of the cartridge 10 on the support deck 16.

The cartridge 10 includes a housing 26 which includes drive access means. In FIG. 1, drive access means comprises openings 28 and 30 which are located on one edgewall 31 of the housing 26. The opening 28 provides access for the drive puck 22. The opening 30 provides access for the transducer head 18. The opening 30 is covered by a door 32 which is biased by a torsion spring 34 towards a closed position covering the opening 30.

A pair of tape reel hubs 36 and 38 are rotatably mounted in the housing 26 on parallel axes. A length of magnetic recording tape 40 is wound on the hubs 36 and 38 such that a portion of the tape 40 extends from one hub to the other hub. Means for defining a tape path in the housing to guide the tape 40 from one hub to the other hub and across the opening 30 includes guide pins 42, 43, 44, 45 and 46. Means for defining a drive belt path includes a drive belt roller 48 mounted on a shaft 49, part of the tape 40 wound on each hub 36 or 38, and belt corner rollers 50 and 52 mounted on shafts 51 and 53, respectively. The drive belt 54 of the present invention extends along the drive belt path such that the drive belt 54 frictionally engages a portion of the magnetic recording tape 40 to cause transport of the tape 40 from one hub to the other hub. The length of the unstretched drive belt 54 is less than the length of the drive belt path so that the belt 54 is stretched when inserted into the cartridge 10.

When the cartridge 10 is engaged with the magnetic recording apparatus 12 as shown in FIG. 1, the drive puck 22 contacts the drive belt roller 48 through the opening 28, and the transducer head 18 contacts the tape 40 through the opening 30. A belt-contacting portion 55 of the drive belt roller 48 is recessed to permit the tape 40 to pass across the drive belt roller 48 without touching the drive puck 22. Cartridges such as cartridge 10 and their operation have been described in U.S. Pat. Nos. 3,692,255 and 4,581,189.

FIGS. 2 and 3 show a portion of the inside of a typical data cartridge which includes a drive roller 62 suitable in the practice of the present invention. The drive roller 62 is rotatably mounted on a shaft 64. The shaft 64 is mounted in a baseplate 66 such that the drive roller 62 rotates on an axis which is substantially perpendicular to the plane of baseplate 66. The drive roller 62 includes a body 68 which has a recessed belt-contacting portion 70 for guiding a drive belt 72. The drive roller 62 also includes an outwardly extending flange 73 at its upper end for engaging the drive puck (not shown) of a magnetic recording apparatus. The drive roller 62 also has a central bore defined by an inner periphery 76. The central bore is adapted to receive the shaft 64.

Generally, configuring the central bore with a diameter approximately 1.1 mils (0.028 mm) greater than the diameter of the shaft 64 has been found to be suitable in the practice of the present invention. For purposes of clarity, the space between the shaft 64 and the inner periphery 76 has been exaggerated in FIG. 3. We have also found that it is desirable for the inner periphery 76 to have a surface roughness (Ra) of 8 microinches (0.2 $\mu$m) to 15 microinches (0.38 $\mu$m), preferably about 10 microinches (0.25 $\mu$m). In the practice of the present invention, surface roughness (Ra) is measured using a Taylor-Hobson Talysurf 10 apparatus. As seen best in FIG. 3, the shaft 64 has a length slightly less than the height of the central bore.

The shaft 64 can be made from a wide variety of materials. Preferably, the shaft 64 is formed with at least a metal coating or more preferably is entirely formed from a metal. A preferred metal material is hardened steel (SAE 52100 $R_c$ 60–64). The drive roller 62 can also be made from a wide variety of materials, but is preferably formed from a thermoplastic or thermosetting resin such as polytetrafluoroethylene, high density polyethylene, polyamide, polyurethane, polyacetal resin, carbonfiber reinforced polyacetal resin, or a combination thereof. A particularly preferred combination of materials for forming the drive roller 62 has been described in U.S. Pat. No. 4,607,808.

In order to reduce both the magnitude and variability of the drive roller drag force, a lubricant 82 according to the present invention is provided between the drive roller 62 and the shaft 64. In previously known lubricants for data cartridges having PTFE particles dispersed in a hydrocarbon-based grease, the particles tended to be poorly dispersed because of the large difference chemically between the particles and the grease. Instead of dispersing uniformly, the particles tended to form relatively large agglomerates in the grease. Some agglomerates may have been too large to fit in the space between the shaft and the inner periphery of the drive roller. When agglomerates are prevented from entering this space, they are not able to provide the intended lubricating effect. As a result, drive roller drag force and drive roller wear are increased, and drag force stability is reduced.

In the practice of the present invention, the lubricant comprises a lubricant carrier, a plurality of fluorinated resin particles dispersed in said lubricant carrier, and a dispersing agent present in an amount effective to aid in dispersing the particles in the lubricant carrier. Preferably, the lubricant carrier comprises a nonfluorinated material. The dispersing agent is a copolymer of a nonfluorinated monomer and a fluorinated monomer, so that the dispersing agent comprises a plurality of nonfluorinated segments compatible with the lubricant carrier and a plurality of fluorinated segments compatible with the fluorinated resin particles. For the purposes of this invention, "nonfluorinated" means that no fluorine is present in the molecular structure of the material, while "fluorinated" means that some amount of fluorine is present in the molecular structure of the material. Compatible materials are defined as those materials which are capable of forming a homogeneous mixture through reasonable means but do not chemically bond within the mixture.

In preferred embodiments of the present invention, the lubricant comprises 60 to 100 parts by weight of the lubricant carrier, 5 to 15 parts by weight, preferably about 10 parts by weight, of the fluorinated resin particles and 0.1 to 2.0, preferably 0.5 to 1.0 parts by weight (based on solids), of the dispersing agent.

A wide variety of materials are suitable as lubricant carriers in the practice of the present invention. Such materials generally have a viscosity in the range from 0.01 to 0.1 Pa-s at 22° C., and exhibit lubricious properties. Examples of suitable lubricant carriers include mineral oils, vegetable oils, synthetic hydrocarbon oils, polyalkylene glycols, petroleum distillates, polyol esters, silicone oils, phosphate esters, esters of fatty acids, combinations of these materials, and the like. These kinds of materials have been described, for example, in U.S. Pat. Nos. 4,711,523, 4,406,801, and 4,507,214.

Most preferably, the lubricant carrier is a synthetic hydrocarbon oil. Preferred synthetic hydrocarbon oils include dialkylated benzenes, polyalkylenes and polyalphaolefins. A particularly preferred synthetic hydrocarbon oil is polydecene. The synthetic hydrocarbon oil preferably has a number average molecular weight measured by gel permeation chromatography (GPC) in the range from about 200 to about 2,000.

In particularly preferred embodiments of the present invention, the lubricant carrier comprises a base oil and a thickening agent, or gellant. This combination is known in the art as a "grease", since the thickening agent is present in sufficient quantity to increase the viscosity of the lubricant to a greaselike consistency.

Used in a sufficient quantity, the thickening agent advantageously reduces the long-term variability of the drive roller drag force as compared to a lubricant in a data cartridge without such a thickening agent. Long-term drag force variability is defined as the variability of the drag force substantially over the life of the data cartridge as indicated by the standard deviation of the drag force measured over a period of time in a drag force testing apparatus. An appropriate amount of thickening agent can be determined, for example, by adding increasing increments of thickening agent to the lubricant and testing the long-term drag force variability after each addition. The optimum amount of thickening agent is then determined as the amount of thickening agent beyond which drag force stability cannot be further improved.

Generally, using 1 to 50, preferably 2 to 40, more preferably 3 to 20, parts by weight of the thickening agent per 100 parts by weight of the base oil, has been found to be suitable in the practice of the present invention. The resulting lubricant preferably has a viscosity less than or equal to about 0.05 Pa-s at 22° C.

A wide variety of thickening agents are suitable in the practice of the present invention, including metallic salts of a fatty acid wherein the counterion is an ion of Ba, Si, Zn, Pb, K, Na, Cu, Mg, Sr, Ca, Li, Al, and the like; clays; polyureas such as those having 2–20 urea bonds and a molecular weight of 100 to 5000; cellulose derivatives; fatty acid esters of dextrin; carbon black; silicon dioxide; aluminum complexes; and the like. Thickening agents have been described in U.S. Pat. Nos. 4,711,523, 4,507,214, and 4,406,801.

The fluorinated resin particles of the present invention are preferably less than one micron in diameter, more preferably 0.1 microns to 0.5 microns in diameter, and most preferably about 0.3 microns in diameter. The size of individual particles is generally measured using a method such as scanning electron microscopy (SEM). Preferred fluorinated resin particles have a substantially spherical shape. Preferred fluorinated resin particles are characterized by a surface energy of less than about 30 dyn/cm.

The fluorinated resin particles can be made from any of a variety of suitable fluorinated resins. Examples of suitable fluorinated resins include polytetrafluoroethylene (PTFE), polyhexafluoropropylene, perfluoroalkyl vinyl ethers, and the like. The use of fluorinated resins for making fluorinated resin particles has been described in U.S. Pat. Nos. 4,724,092 and 4,472,290. Preferably the fluorinated resin is PTFE with a number average molecular weight in the range from 2,000 to 100,000.

The dispersing agent of the present invention is a copolymer which is a reaction product of copolymerizable monomers; such monomers comprise a nonfluorinated monomer and a fluorinated monomer. The copolymerized dispersing agent comprises a plurality of nonfluorinated segments and a plurality of fluorinated segments.

Advantageously, the dispersing agent of the present invention dramatically reduces the size of the fluorinated resin particle agglomerates that form in the lubricant carrier, particularly when the lubricant carrier is a nonfluorinated material. In the absence of a dispersing agent, for example, we observed that agglomerates of 0.3 micron PTFE particles in a commercially available hydrocarbon grease were as large as 100 microns. In the presence of the dispersing agent of the present invention, however, the agglomerates of the same PTFE particles in the same grease were reduced in size to 2 to 3 microns or less. We believe the dispersing agent works so well because the fluorinated segments are compatible with the fluorinated resin particles and the nonfluorinated segments are compatible with the lubricant carrier.

The benefits of reducing the size of the agglomerates are numerous. Drag force level is reduced and is more stable over longer periods of time. Further, the drive roller and the shaft last longer due to less wear at the interface between them. However, lubricant with extremely small agglomerate size has been observed to result in a high and unstable drag force. We believe this is due to a loss in the "ball bearing" effect of the agglomerates in the lubricant. The agglomerates contained in the lubricant of this invention therefore preferably have a diameter in the range from 1 to 40 μm, more preferably 4 to 8 μm.

Referring again to the dispersing agent, the molar ratio of nonfluorinated monomer to fluorinated monomer is preferably in the range from 1 to 9 to 9 to 1, more preferably from 3 to 7 to 7 to 3; the weight average molecular weight of the resulting copolymer is preferably in the range from 5000 to 500,000, more preferably 10,000 to 50,000. The nonfluorinated and fluorinated monomers are preferably copolymerized so that chain segments derived from the nonfluorinated and fluorinated monomers are arranged randomly in the copolymer backbone. Such copolymers obtained from copolymerizable fluorinated and nonfluorinated monomers have been described in U.S. Pat. Nos. 3,341,497; 3,787,351; 4,484,990; 4,795,764; and 5,098,446.

Preferably, the copolymerizable nonfluorinated monomer is a nonfluorinated (meth)acrylate and the copolymerizable fluorinated monomer is a fluorinated (meth)acrylate. For the purposes of this invention, (meth)acrylate means either methacrylate or acrylate. The nonfluorinated (meth)acrylate monomer preferably may be represented by the formula

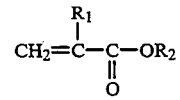

wherein $R_1$ is —H or —$CH_3$, and $R_2$ is a straight or branched nonfluorinated alkyl or alkoxy group of 4 to 30 carbon atoms. Specific examples of such nonfluorinated (meth)acrylates include butyl methacrylate and octadecyl methacrylate.

The fluorinated (meth)acrylate monomer preferably may be represented by the formula

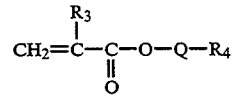

In the above formula, $R_3$ is —H or —$CH_3$, Q is either a covalent bond or a multivalent linking moiety, and $R_4$ is a monovalent fluoroaliphatic radical having from 4 to 22 carbon atoms.

Q may be alkylene, arylene, oxyalkylene, or combinations of such groups with such hetero-atom-containing moieties as oxy, thio, carbonyl, sulfonyl, sulfinyl, sulfonamido, carbonamido, ureylene, carbamato, and imino. Q may be for example sulfonamidoalkylene, oxydialkylene (e.g., —$C_2H_4OC_2H_4$—), thiodialkylene (e.g., —$C_2H_4SC_2H_4$—), and the like. A preferred sulfonamidoalkylene group has the formula —$R_5$—N($R_6$)—$SO_2$—, wherein $R_5$ is an alkylene group having from 2 to 6 carbon atoms, and $R_6$ is an alkyl group having from 1 to 8 carbon atoms.

$R_4$ may be straight, branched or, if sufficiently large, cyclic and may include oxygen, chlorine, hydrogen, hexavalent sulfur or trivalent nitrogen atoms bonded only to carbon atoms. The terminal portion of the $R_4$ radical is a perfluorinated moiety which preferably contains at least 2 fluorine atoms. The preferred $R_4$ radicals are perfluorinated aliphatic radicals of the formula —$C_nF_{2n+1}$ where n is from about 4 to about 22.

Polymeric dispersing agents of the present invention, comprising a reaction product of copolymerizable monomers, may be prepared by free-radical polymerization methods known in the art. These methods include but are not limited to bulk, solution, emulsion and suspension polymerization methods such as those which have been described in U.S. Pat. No. 3,341,497. Among the solvents which can be used as media in the solution polymerizations are trichlorofluoromethane, 1,1,2-trichloro-1,2,2-trifluoroethane, benzene, heptane, benzotrifluoride, xylene hexafluoride, 1,1,1 trichloroethane, ethyl acetate and butyl acetate.

One particularly preferred dispersing agent is obtained by randomly copolymerizing 35 parts by weight of a nonfluorinated monomer having the formula

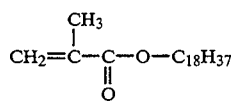

with 65 parts by weight of a fluorinated monomer having the formula

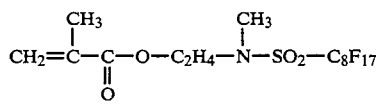

In addition to the lubricant carrier, fluorinated resin particles, and dispersing agent, the lubricant of the present invention may also contain other suitable additives such as antioxidants, antiwear agents, anticorrosion agents, fungitides, bactericides, antistatic agents, fillers, and pigments.

To prepare the lubricant of the present invention according to one method, the starting material is an admixture of fluorinated resin particles in a lubricant carrier. One such material which is commercially available contains about 80% by weight hydrocarbon oil, in which is dispersed about 9% by weight PTFE particles, 8% by weight lithium hydroxystearate and 3% by weight silicon dioxide. This material has a grease-like consistency, and the maximum particle agglomerate size is about 100 μm.

To 100 parts by weight of this starting material is added 0.1 to 1.5 parts by weight, based on solids, of a dispersing agent of the present invention. A solvent is also added in a quantity effective to reduce the viscosity of the mixture to a level suitable for dispersing. Suitable solvents include hexane and heptane. The mixture is then dispersed for a period of time sufficient to obtain the desired agglomerate size. A longer dispersing time generally results in a smaller agglomerate size. The rate of size reduction will depend upon the dispersing method chosen and the conditions used. Sonification is a particularly preferred dispersing method, although other effective methods of dispersing include colloid milling and homogenizing. Dispersing is followed by the removal of residual solvent using a vacuum oven or other suitable means.

Alternatively, the lubricant of this invention can be prepared by combining the previously described ingredients as follows: 60 to 90 parts by weight of the hydrocarbon base oil, 2 to 15 parts by weight of the fluorinated resin particles and 0.1 to 1.5 parts by weight of solids of the dispersing agent are mixed together until a uniform mixture is obtained. If the dispersing agent contains a solvent, the residual solvent is removed using a vacuum oven or other suitable means, and the mixture is dispersed until the desired agglomerate size is reached. The thickening agent is then mixed into the dispersion in sufficient quantity, generally 2 to 15 parts by weight, so that the resulting lubricant has a grease-like consistency.

The lubricant of the present invention can be applied between the drive roller and the shaft in a variety of ways. For example, the lubricant can be first applied to the shaft after which the drive roller is mounted on the lubed shaft. Alternatively, the lubricant can be applied to the inner periphery of the drive roller first after which the drive roller is then mounted on the shaft. As an alternative, the lubricant can be applied to both the shaft and the drive roller, after which the drive roller is mounted on the shaft.

The amount of lubricant applied between the drive roller and the shaft can be varied depending upon the viscosity of the lubricant and the desired level of drag force. However, if too little lubricant is used, the drag force may become too high or be unstable. If too much lubricant is used, a large amount of excess lubricant can migrate out from between the drive roller and the shaft. Generally using an amount of lubricant sufficient to occupy 60 percent to 100 percent, preferably 100 percent, of the volume of the central bore remaining after the drive roller is mounted on its shaft has been found to be suitable in the practice of the present invention.

The present invention will now be further described with reference to the following examples.

EXAMPLES

EXAMPLE 1

A fluorochemical polymer, hereinafter referred to as Copolymer A, was prepared for use as a dispersing agent by the following method: A mixing vessel was charged with 6.4 parts by weight of a monomer having the formula $C_8F_{17}SO_2N(CH_3)CH_2CH_2OC(O)C(CH_3)=CH_2$, 3.4 parts by weight of stearyl methacrylate monomer, 14 parts by weight of 1,1,1 trichloroethane, and 0.1 parts by weight of VAZO TM 64 thermal initiator (2,2'-azobisisobutyrol nitrile from E.I. Dupont de Nemours and Co.) The vessel was purged with nitrogen, sealed and reacted at a temperature of 65° C. for 16 hours.

The lubricant of the present invention was prepared according to the following formulation:

| Ingredient | weight [g] |
| --- | --- |
| A commercially available grease containing (by weight) 80% hydrocarbon oil, 9% PTFE particles, 8% lithium hydroxystearate and 3% fumed silica | 25 |
| Copolymer A | 0.1 (based on solids) |
| Heptane | 25 |

The ingredients were added, in order, to a 100 ml bottle and mixed together. The bottle was placed in a cold water bath, and then a Model 250 Sonifier (Branson) with a ½" horn was inserted into the bottle. The mixture was dispersed by sonification at a power level of 100 W for 2 hours. Heptane was then removed with a vacuum oven at 60°–80° C. for about 16 hours. The PTFE particle agglomerates in the resulting dispersed lubricant, identified as sample 1A, had a maximum agglomerate size of 5 μm. To evaluate maximum agglomerate size, a small sample of the lubricant was placed on a microscope slide and covered with a thin cover glass. The lubricant sample was squeezed into a thin layer between the slide and the cover without lateral shearing. The sample was then observed in transmitted light under a ZEISS optical microscope at 880 times magnification. Optical pictures were taken and the size of the largest agglomerate within the viewing area was measured by a scale inside the eye piece of the camera.

Sample 1A was applied to a drive roller in a quantity such that when the roller was placed on its shaft, the space between the inner periphery of the roller and the shaft was completely filled. Another assembly was prepared having the commercially available grease as obtained from the manufacturer (identified as Sample 1B) as the lubricant. The results of drag force testing on both assemblies are shown in the following table. Mean drag force and drag force variability values were estimated from output traces produced during the test.

| Sample | Maximum Agglomerate Size (μm) | Mean Drag Force (oz) (estimated) | Drag Force Variability (oz) (estimated) |
| --- | --- | --- | --- |
| 1A | 5 | 0.19 | 0.15 |
| 1B | 100 | 0.51 | 0.30 |

Sample 1A gave a much lower and more stable drag force than Sample 1B.

EXAMPLE 2

Lubricant samples 2A, 2B, and 2C were prepared according to the invention so as to have a range of fluorinated resin particle agglomerate sizes. For each sample, the formulation and method of Example 1 were used, except that sonification time was varied with each sample to obtain the desired agglomerate size. Sample 2D was also prepared in the manner of Example 1 but without the use of Copolymer A. Samples 2A, 2B, 2C, and 2D had maximum agglomerate sizes of 2 μm, 8 μm, 15 μm, and 9 μm respectively, measured as described in Example 1. The lubricant samples were then evaluated by measuring drag force over time. For comparison, the commercially available grease of Example 1 as obtained from the manufacturer (Sample 2E) and the commercially available grease without PTFE particles, obtained as a special sample from the manufacturer (Sample 2F) were also tested as controls. No dispersing agent was added to Samples 2E or 2F, nor were these samples sonified. The agglomerate size and drag force data are shown in the table below. Mean drag force and drag force variability values were calculated from data points recorded during drag force testing.

| Lubricant Sample Number | Maximum Agglomerate Size (μm) | | Mean Drag Force (oz) | Drag Force Variability (oz) (standard deviation) |
| --- | --- | --- | --- | --- |
| | Initial | after drag force test | | |
| 2A | 2 | 2 | 0.30 | 0.07 |
| 2B | 8 | 6 | 0.16 | 0.03 |
| 2C | 15 | 8 | 0.18 | 0.07 |
| 2D | 9 | 6 | 0.28 | 0.06 |
| 2E | 100 | 14 | 0.51 | 0.19 |
| 2F | — | — | 0.77 | 0.14 |

Sample 2E exhibited a high mean drive force over the course of the test, while Sample 2F was even higher. In both cases the drag force variability was high as indicated by the large standard deviations. The high and unstable drag force of Sample 2E is most likely due to the presence of large agglomerates which cause high viscosity of the lubricant and wear on the drive roller. In the case of Sample 2F, the high and unstable drag force is probably caused by the absence of the ball bearing effect provided by the PTFE particles to prevent excessive contact between the drive roller and the shaft at their interface.

Again referring to the table, Sample 2B provided the lowest and most stable drag force. Sample 2C also had a low mean drag force with a low variability, although its drag force curve showed high initial values which subsequently decreased to a lower and more stable level. Sample 2A had a high and unstable drag force. The results of these experiments suggest that there is an optimum size for the PTFE particle agglomerates. Specifically, the data indicates that the agglomerates are too large in Sample 2C (15 μm maximum) and Sample 2E (100 μm maximum) and too small in Sample 2A (2 μm maximum). In addition, the agglomerate sizes in Samples 2C, 2D and 2E decreased after prolonged shearing during drag force testing (see Table above), indicating that these samples were approaching an optimum size as the test progressed. Overall, the optimum maximum PTFE particle agglomerate size is felt to be in the range from 4 to 8 μm.

Sample 2D having no dispersing agent produced a relatively high drag force, indicating that the presence of dispersing agent is itself effective for reducing drag force. Although the precise relationship between dispersing agent content and drag force behavior is not fully known, the dispersing agent may be altering the viscosity of the lubricant by a variety of surfactant mechanisms.

EXAMPLE 3

This example demonstrates the effect of dispersing method on the performance of the lubricant of the present invention. Copolymer A was prepared as described in Example 1. 25 g of the commercially available grease, 0.1 g of Copolymer A (based on solids), and 25 g of hexane were mixed together and put into a cylindrical steel container having steel ball bearing mixing media inside. The mixture was shaken in a paint shaker for 16 hours. After removal of hexane with a vacuum oven at 60°–80° C., the maximum PTFE agglomerate size in the resulting dispersed lubricant was found to be 3 μm.

The lubricant was applied to a drive roller in a quantity sufficient to fill the central bore when the roller was placed on its shaft. The shaft/roller assembly was then tested for drag force. A very unstable and irregular drag force was observed, probably due to small fragments of steel mixing media remaining in the lubricant after shaking. This method of dispersing is not considered to be suitable for the present invention.

EXAMPLE 4

The ability of several dispersing agents of the present invention to disperse PTFE particles in solvent was evaluated as a means of predicting the performance of these materials in the lubricant of the present invention. The dispersing agents are identified as Copolymer A, Copolymer B, and Copolymer C.

Copolymer A was prepared as described in Example 1. Copolymer B was prepared as follows: A mixing vessel was charged with 3.2 parts by weight of a monomer having the formula $C_8F_{17}SO_2N(CH_3)CH_2CH_2OC(O)C(CH_3)=CH_2$, 1.7 parts by weight of stearyl methacrylate monomer, 3.5 parts by weight of ethyl acetate, 8.1 parts by weight of heptane and 0.1 parts by weight of VAZO ™ 64 thermal initiator. The vessel was purged with nitrogen, sealed and reacted at a temperature of 65° C. for 10 hours. Copolymer C was prepared as follows: A mixing vessel was charged with 4.8 parts by weight of a monomer having the formula $C_8F_{17}SO_2N(CH_2CH_3)CH_2CH_2OC(O)C(CH_3)=CH_2$, 4.8 parts by weight of stearyl methacrylate monomer, 9.6 parts by weight of aromatic naphtha (a mixture of hydrocarbons ranging from $C_8$–$C_{11}$ with a boiling point from 173° C. to 218° C., identified by CAS No. 8030-30-6) and 0.1 parts by weight of VAZO ™ 64 thermal initiator. The vessel was purged with nitrogen, sealed and reacted at a temperature of 65° C. for 12 hours.

Dispersions were prepared according to the following formulations:

| Ingredient quantity | Sample 4A | 4B | 4C |
|---|---|---|---|
| MP1000 Teflon brand particles (E. I. Dupont de Nemours and Co.), 11–14 μm mean particle diameter by volume [parts by weight] | 10 | 10 | 10 |
| Copolymer A [parts by weight of solids] | 1 | | |
| Copolymer B [parts by weight of solids] | | 1 | |
| Copolymer C [parts by weight of solids] | | | 1 |
| Hexane [parts by weight] | 33 | 33 | 33 |

To prepare each dispersion sample, the PTFE particles and fluorochemical polymer were mixed with the hexane, and sonified for 5 minutes at 50% power. The particle size distribution of each dispersion was then measured with a Microtrac II particle analyzer manufactured by Leeds and Northrup Company. The "particles" detected by the particle analyzer were assumed to be a mixture of agglomerates and single PTFE particles. The results are summarized in the table below:

| Sample | cumulative particle size distribution [μm] | | | |
|---|---|---|---|---|
| | 10% of particles | 50% of particles | 90% of particles | Mean size by volume |
| 4A | ≦0.2 | ≦28.4 | ≦51.7 | 27.35 |
| 4B | ≦0.2 | ≦9.6 | ≦20.5 | 10.2 |
| 4C | ≦0.2 | ≦13.8 | ≦35.5 | 21.21 |

(Note: the results for Samples 4A and 4B are the average of two trials.)

The results indicate that Samples 4B and 4C exhibited particle size distributions comparable to or smaller than Sample 4A, which comprised Copolymer A as the dispersing agent. Since Copolymer A was effective as a dispersing agent for the lubricant of this invention, as shown in Examples 1 and 2, it is expected that the fluorochemical polymers in Samples 4B and 4C would also be effective.

Other embodiments of this invention will be apparent to those skilled in the art upon consideration of this specification or from practice of the invention disclosed herein. Various omissions, modifications, and changes to the principles described herein may be made by one skilled in the art without departing from the true scope and spirit of the invention which is indicated by the following claims.

What is claimed is:

1. A data storage device of the type having a roller mounted on a shaft, wherein a lubricant is provided between the shaft and the roller, said lubricant comprising:
    a) a lubricant carrier;
    b) a plurality of fluorinated resin particles dispersed in said lubricant carrier; and
    c) a dispersing agent present in an amount effective to aid in dispersing said particles in said lubricant carrier, wherein the dispersing agent is a copolymer of monomers, said monomers comprising a nonfluorinated monomer and a fluorinated monomer, such that the copolymerized dispersing agent comprises a plurality of nonfluorinated segments and a plurality of fluorinated segments.

2. The data storage device of claim 1, wherein the roller is a drive roller, and the data storage device is a data cartridge.

3. The data storage device of claim 1, wherein the lubricant carrier is a nonfluorinated material.

4. The data storage device of claim 3, wherein the lubricant comprises:
    60 to 100 pans by weight of the lubricant carrier;
    5 to 15 pans by weight of the fluorinated resin particles; and
    0.1 to 2.0 pans by weight of solids of the dispersing agent.

5. The data storage device of claim 3, wherein the lubricant carrier is selected from the group consisting of a synthetic hydrocarbon oil, a mineral oil, a vegetable oil, a polyalkylene glycol, a petroleum distillate, a polyol ester, a silicone oil, a phosphate ester, an ester of a fatty acid, and combinations thereof.

6. The data storage device of claim 3, wherein the lubricant carrier is a synthetic hydrocarbon oil.

7. The data storage device of claim 6, wherein the synthetic hydrocarbon oil has a molecular weight in the range from about 200 to about 2,000.

8. The data storage device of claim 6, wherein the synthetic hydrocarbon oil is selected from the group consisting of a polyalphaolefin, a linear dialkylbenzene, and a polyalkylene.

9. The data storage device of claim 3, wherein the lubricant carrier is a grease.

10. The data storage device of claim 9, wherein the grease comprises a base oil and a thickening agent in admixture with the base oil.

11. The data storage device of claim 10, wherein the base oil is a nonfluorinated material selected from the group consisting of a synthetic hydrocarbon oil, a mineral oil, a vegetable oil, a polyalkylene glycol, a petroleum distillate, a polyol ester, a silicone oil, a phosphate ester, an ester of a fatty acid, and combinations thereof.

12. The data storage device of claim 10, wherein the base oil is a synthetic hydrocarbon oil.

13. The data storage device of claim 12, wherein the synthetic hydrocarbon oil has a molecular weight in the range from about 200 to about 2,000.

14. The data storage device of claim 12, wherein the synthetic hydrocarbon oil is selected from the group consisting of a polyalphaolefin, a linear dialkylbenzene, and a polyalkylene.

15. The data storage device of claim 10, wherein the thickening agent is present in an amount sufficient to adjust the lubricant viscosity to a grease-like consistency.

16. The data storage device of claim 10, wherein the lubricant comprises:
60 to 90 parts by weight of the base oil,
2 to 15 parts by weight of the thickening agent,
2 to 15 parts by weight of the fluorinated resin particles, and
0.1 to 1.5 parts by weight of solids of the dispersing agent.

17. The data storage device of claim 16, wherein the base oil is a synthetic hydrocarbon oil.

18. The data storage device of claim 16, wherein the thickening agent is selected from the group consisting of silicon dioxide, carbon black, a metallic salt of a fatty acid, a clay, a polyurea, a fatty acid ester of dextrin, an aluminum complex, and a cellulose derivative.

19. The data storage device of claim 18, wherein the metallic salt of a fatty acid is selected from the group consisting of a Li, Cu, Na, K, Ca, Mg, Ba, Zn, Si, Sr, Al, or Pb salt of stearate, hydroxystearate, oleate, azelate, and mixtures thereof.

20. The data storage device of claim 3, wherein the fluorinated resin particles comprise a resin selected from the group consisting of polytetrafluoroethylene resin, polyhexafluoropropylene resin, and perfluoroalkyl vinyl ether resin.

21. The data storage device of claim 3, wherein the fluorinated resin particles are substantially spherical.

22. The data storage device of claim 3, wherein the fluorinated resin particles have an average particle size in the range from about 0.1 μm to about 0.5 μm.

23. The data storage device of claim 3, wherein the fluorinated resin particles have a surface energy of less than about 30 dyn/cm.

24. The data storage device of claim 3, wherein the fluorinated resin particles comprise polytetrafluoroethylene resin.

25. The data storage device of claim 24, wherein the fluorinated resin particles are present in agglomerates having a maximum diameter in the range from about 1 μm to about 40 μm.

26. The data storage device of claim 24, wherein the fluorinated resin particles are present in agglomerates having a maximum diameter in the range from about 4 μm to about 8 μm.

27. The data storage device of claim 26, wherein the polytetrafluoroethylene resin of the fluorinated resin particles has a molecular weight in the range from 2000 to 100,000.

28. The data storage device of claim 3, wherein the nonfluorinated monomer is a nonfluorinated (meth)acrylate.

29. The data storage device of claim 28, wherein the nonfluorinated (meth)acrylate has the formula

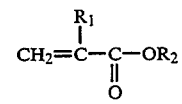

wherein $R_1$ is —H or —CH$_3$, and $R_2$ is a straight or branched nonfluorinated alkyl or alkoxy group of 4 to 30 carbon atoms.

30. The data storage device of claim 28, wherein the fluorinated monomer is a fluorinated (meth)acrylate.

31. The data storage device of claim 30, wherein the fluorinated (meth)acrylate has the formula

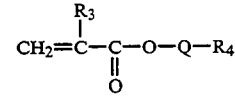

wherein $R_3$ is —H or —CH$_3$, Q is a covalent bond or a divalent linking moiety, and $R_4$ is a monovalent fluoroaliphatic radical having from 4 to 22 carbon atoms.

32. The data storage device of claim 31, wherein Q is a divalent linking moiety selected from the group consisting of alkylene, arylene, oxyalkylene, and combinations thereof.

33. The data storage device of claim 32, wherein the combinations comprise at least one hetero-atom-containing moiety selected from the group consisting of oxy, thio, carbonyl, sulfonyl, sulfinyl, sulfonamido, carbonamido, ureylene, carbamato, and imino.

34. The data storage device of claim 33, wherein $R_4$ is a perfluorinated aliphatic radical having the formula —$C_nF_{2n+1}$, wherein n is from 4 to 22.

35. The data storage device of claim 34, wherein Q has the formula

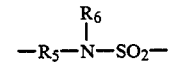

wherein $R_5$ is an alkylene group having from 2 to 6 carbon atoms, and $R_6$ is an alkyl group having from 1 to 8 carbon atoms.

36. The data storage device of claim 3, wherein the nonfluorinated monomer is

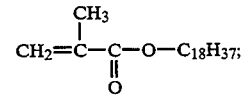

the fluorinated monomer is

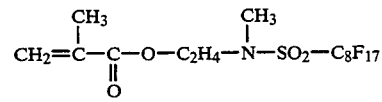

and the weight ratio of the nonfluorinated monomer to the fluorinated monomer is in the range from 1:9 to 9:1.

* * * * *

UNITED STATES PATENT AND TRADEMARK OFFICE
CERTIFICATE OF CORRECTION

PATENT NO.: 5,448,440
DATED: September 5, 1995
INVENTOR(S): Law et al.

It is certified that error appears in the above-identified patent and that said Letters Patent is hereby corrected as shown below:

Col. 3, line 52, "polytetrafiuoroethylene" should be --polytetrafluoroethylene--.

Col. 6, line 50, "R4" should be --$R_4$--.

Col. 7, line 37, "fungitides" should be --fungicides--.

Col. 12, line 33, in claim 4, "claim 3" should be --claim 2--.

Col. 12, line 40, in claim 5, "claim 3" should be --claim 2--.

Col. 12, line 46, in claim 6, "claim 3" should be --claim 2--.

Col. 12, line 55, in claim 9, "claim 3" should be --claim 2--.

Col. 13, line 34, in claim 20, "claim 3" should be --claim 2--.

Col. 13, line 39, in claim 21, "claim 3" should be --claim 2--.

Col. 13, line 41, in claim 22, "claim 3" should be --claim 2--.

Col. 13, line 43, "µtm" should be --µm--.

Signed and Sealed this

Twenty-eighth Day of May, 1996

*Attest:*

BRUCE LEHMAN

*Attesting Officer*   Commissioner of Patents and Trademarks